United States Patent [19]

Olson

[11] 4,080,935
[45] Mar. 28, 1978

[54] ROTARY INTERNAL COMBUSTION ENGINE

[76] Inventor: Leonard Olson, 107 W. Cheyenne Rd., Colorado Springs, Colo. 80906

[21] Appl. No.: 692,642

[22] Filed: Jun. 4, 1976

[51] Int. Cl.² .................................. F02B 53/00
[52] U.S. Cl. ...................... 123/205; 418/61 R; 123/212; 123/244
[58] Field of Search ............... 123/8.31, 8.33, 8.4 J, 123/18 R; 418/61 R

[56] References Cited

U.S. PATENT DOCUMENTS

| | | | |
|---|---|---|---|
| 885,006 | 4/1908 | Barnes | 123/8.31 |
| 1,136,409 | 4/1915 | Conrady | 418/61 R |
| 1,434,446 | 11/1922 | McQueen | 123/8.07 |
| 2,950,706 | 8/1960 | Senckel | 123/32 EA |
| 3,809,024 | 5/1974 | Abbey | 123/8.45 |

*Primary Examiner*—Carlton R. Croyle
*Assistant Examiner*—Michael Koczo, Jr.
*Attorney, Agent, or Firm*—Wm. Griffith Edwards

[57] ABSTRACT

An internal combustion engine of the rotary type comprises a housing or block provided with a cavity which is cylindrical in one portion and enlarged in another; the side walls of the cavity are flat. A drive shaft is rotatably mounted in the housing for rotation about the axis of the cylindrical portion of the cavity and a cylindrical rotor is mounted in fixed relationship eccentrically on the shaft. The throw of the eccentric is somewhat less than the radius of the cylindrical portion so that the eccentric acts as an impeller driving air around the cylindrical portion of the cavity with some blow-by of air and no metal to metal contact. A pair of fluid barriers or partitions are pivoted at their outer ends on the wall of the cavity and have their opposite ends biased against the rotor in sealing engagement. The partitions thus divide the cavity into a combustion chamber and an air pumping chamber. The air pumping chamber is further divided into an air intake chamber and an air compression chamber, these communicating through the restricted space between the rotor and the wall of the cylindrical portion of the cavity. The side walls and the rotor and partitions are in sliding sealing engagement. The ignition system may be conventional, timed in accordance with rotor positions. The fuel injection system is of the electronic solenoid actuated type adapted for use on the rotary engine of the disclosure.

12 Claims, 8 Drawing Figures

ROTARY INTERNAL COMBUSTION ENGINE

This invention relates to internal combustion engines of the rotary type and particularly to an improved engine having an eccentric cylindrical rotor.

Various forms or types of rotary internal combustion engines have been devised heretofore, and have met with different degrees of success. It is desirable to provide more efficient engines and engines which use fuel more effectively and with lesser discharge of undesirable products of combustion. Accordingly, it is an object of my invention to provide a rotary internal combustion engine of improved and simplified construction.

It is another object of my invention to provide a rotary internal combustion engine which is efficient in operation and which emits a lesser amount of undesirable or objectionable exhaust fumes than the conventional reciprocating piston engine.

It is another object of my invention to provide a rotary internal combustion engine including an improved arrangement for effecting more complete combustion of the fuel.

It is a further object of my invention to provide an improved rotary internal combustion engine which is capable of delivering high torque at low speeds.

It is a still further object of my invention to provide a two-cycle rotary engine having an improved arrangement for effecting positive purging.

Briefly, in carrying out the objects of my invention in one embodiment thereof, an engine housing is provided which has flat smooth spaced internal side walls and an internal cavity which has a cylindrical portion and an enlarged portion. A drive shaft is mounted in the housing for rotation about the axis of the cylindrical portion of the cavity, and a cylindrical rotor is rigidly mounted on the shaft eccentrically thereof and has a throw such that the rotor is slightly spaced from the cylindrical wall of the cavity and operates without frictional contact with the cylindrical wall. A pair of fluid barriers or partitions are pivoted on the inner wall of the housing at their outer ends and are pressed into sealing and sliding engagement with the rotor at their opposite ends. These partitions divide the cavity into two chambers — a combustion chamber and an air pumping chamber. As the eccentric rotor moves around the cylindrical cavity it draws air from an intake port and compresses air ahead of it and is an impeller rather than a positive displacement pump. Slightly compressed air, say at around two atmospheres, is discharged to the combustion chamber through passages in the end wall of the housing and in the rotor and purges burned gases from the combustion chamber and thereafter air remaining in the combustion chamber is mixed with fuel injected into the chamber and ignited. The high pressure gases thus generated urge the barriers against the rotor and thus act directly against the rotor to drive the rotor through crank arms provided by its eccentricity. The exhaust valves are controlled in synchronism with the rotor and the air passages are controlled by the position of the rotor, the valves being rotated at one-half the rate of rotation of the rotor. The power is delivered through the drive shaft.

The features of novelty which characterize my invention are pointed out with particularity in the claims annexed to and forming a part of this specification. My invention itself, however, both as to its organization and its manner of operation, together with further objects and advantages thereof, will best be understood upon reference to the following description taken in connection with the accompanying drawings in which:

Figure 1:
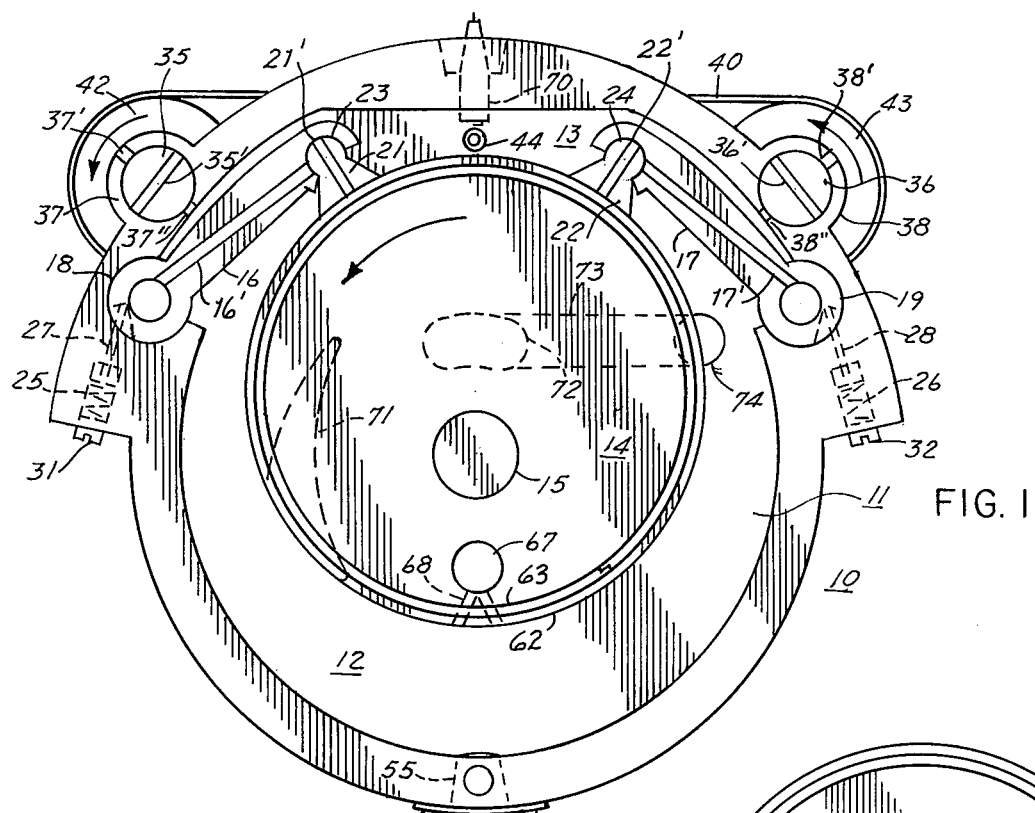
FIG. 1 is a somewhat diagrammatic sectional end elevation view of an engine embodying the invention, with the rear flat wall removed to show the interior.

Referring now to the drawings, the engine as shown in FIG. 1 comprises a housing or block 10 formed to provide a cavity 11 including a lower right cylindrical chamber 12 and an upper enlarged chamber 13. A rotor 14 is mounted rigidly on a shaft 15 which is mounted in the housing walls for rotation about the axis of the cylindrical chamber. The rotor is eccentrically mounted on the shaft and its throw is slightly less than the radius of the cylindrical chamber so that the rotor moves with its outermost surface axial line in close proximity to the cylindrical wall of the cavity during one part of each revolution. The rotor thus acts as an impeller rather than a positive displacement piston.

The cavity 11 is divided into two separate expansible chambers by a pair of rectangular, plate-like fluid barriers or partitions 16 and 17. These barriers are pivotally mounted on the inner walls of the housing along their outer edges and are biased into engagement with the surface of the rotor at their opposite or inner edges. The barriers 16 and 17 are provided at both ends with spring loaded sealing strips 16' and 17' for engagement with the flat end walls of the housing, and the ends of the feet 21 and 22 are, similarly, provided with spring pressed sealing strips 21' and 22'. The pivoted edges of the barriers are of cylindrical configuration as indicated at 18 and 19, respectively, and fit in cylindrical seats in the housing wall. This construction provides an effective fluid seal between the two sides of each barrier. The inner edges of the barriers are formed by elongated sealing elements or feet 21 and 22 which are mounted on the respective barriers by cylindrical attaching portions 23 and 24 fitted in the manner of bearings in cylindrical retaining recesses along the edges of the barriers. The feet 21 and 22 have areas in sliding and sealing engagement with the cylindrical surface of the rotor; these areas are concave portions of the feet conforming to the cylindrical surface of the rotor. The barrier plates are biased into engagement with the rotor by springs 25 and 26, respectively, the force of the springs applied through push rods 27 and 28 tending to rotate the barriers about their pivots. The compressive force of the springs may be adjusted by turning screw plugs 31 and 32, respectively.

It will thus be seen that the barriers divide the cavity 11 into two separate expansible chambers, the chamber above the barriers being the combustion chamber and that below an air pumping chamber. These chambers expand and contract with changes in position of the eccentric rotor.

Figures 2, 3, 4:
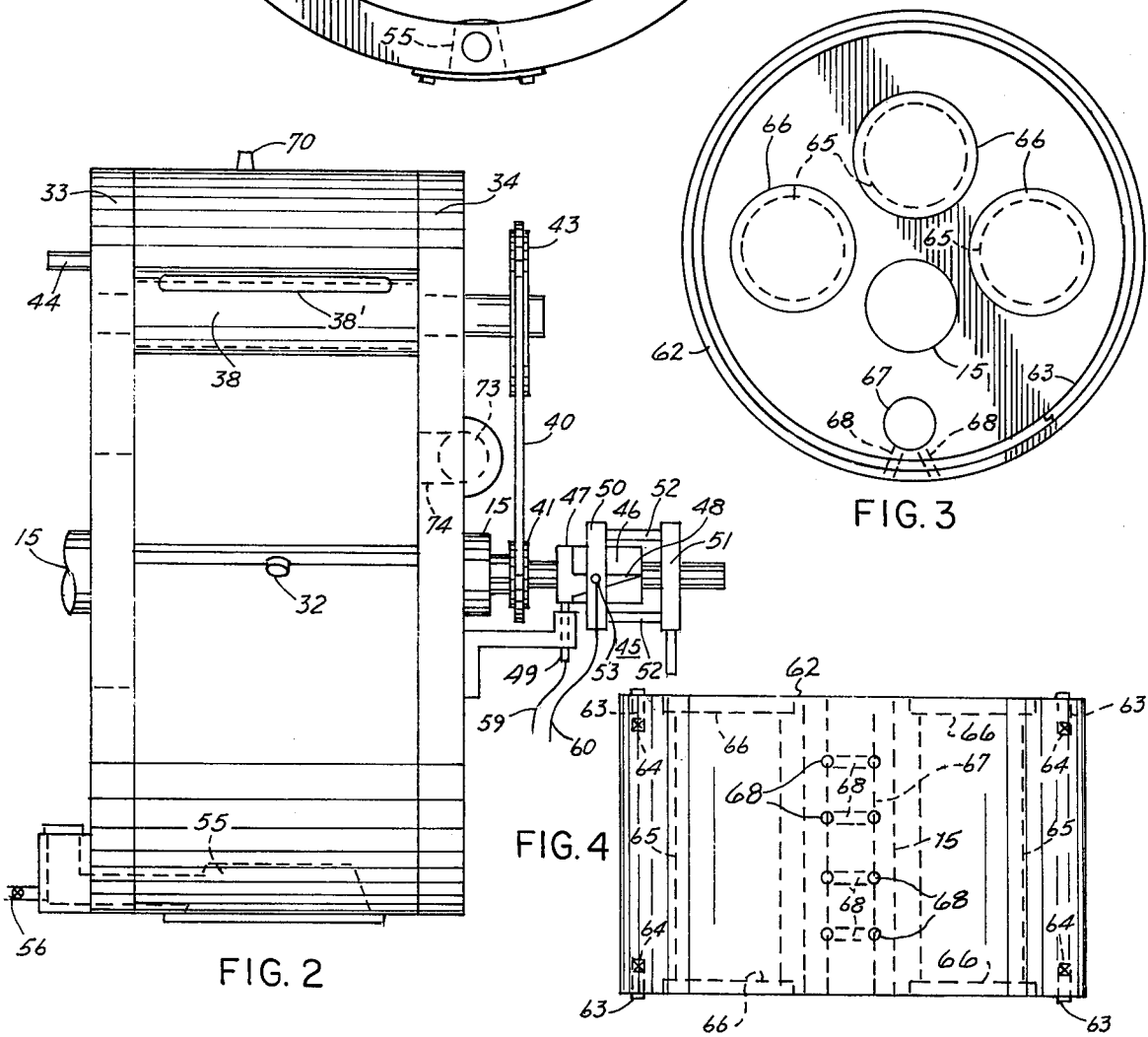
FIG. 2 is a right hand elevation view of the engine of FIG. 1.
FIG. 3 is an end elevation view of the rotor of the engine.
FIG. 4 is a top plan view of the rotor.

As shown in FIG. 2 the housing is closed by end plates 33 and 34 which are securely attached and sealed to the central portion 10 of the housing. The end plates have smooth flat surfaces and the rotor end faces engage the flat surfaces of the plates in sealing relationship. The discharge of combustion gases from the combustion chamber is controlled by the operation of two exhaust valves 35 and 36, which are rotary valves of the slotted cylinder type. These valves are mounted for rotation in cylindrical bearing passages provided in enlarged portions 37 and 38 of the housing 10 and which have discharge slots 37' and 38', respectively, the slot 38' being shown in FIGS. 1 and 2. The construction of the valve 35 and its discharge slot 37' and cover are the same as that of the valve 36 and its slot 38'. The rotary valves 35 and 36 are driven from the shaft 15 at a two to one ratio by a roller chain 40 which engages a sprocket 41 driven by the shaft 15 and sprockets 42 and 43 for rotating the valves 35 and 36, respectively. Thus when the rotor turns through ninety degrees the valves 35 and 36 turn through 45°. The valves 35 and 36 have diametrical slots or passages 35' and 36' therein which in the open position of the valves connect the slots 37' and 38' with inner slots 37'' and 38'' which open into the combustion chamber.

Fuel for producing the combustible mixture is injected through a conventional solenoid electronic spray valve 44 and the timing of the injection and the amount of fuel injected is determined by operation of a control 45 which may be adjusted to change the amount of fuel injected and which is actuated by the engine shaft 15. The control 45 includes an insulated cylinder 46 which carries a conducting member 47 including a ring about the left end of the cylinder 46 and a tapered portion 48 extending towards the right. A yoke comprising collars 50 and 51 connected by rods 52 is slidable with respect to the cylinder 46 and may also be turned within a predetermined small angle. Axial movement of the collar 50 with respect to the cylinder 46 moves a brush 53 axially and determines the length of conducting path over the tapered conductor 48 and thereby controls the length of time during which the injection solenoid (not shown) is energized, thus for increased fuel injection the collar 50 is moved to the left and for decreasing quantities of injected fuel is moved to the right. The timing of the fuel injection may be varied by changing the angular relationship of the brush 53 and the conductor 48.

The lubricating system for the engine may include a pressure circulating system for delivering oil to the moving parts and an oil sump and wick drain are provided in the bottom of the housing 10, as indicated at 55. A valve 56 may be provided for draining the oil from the sump. The rotor is lubricated by brushing the wick and carries an oil film to the sealing feet 21 and 22.

The electrical connection for the fuel injection circuit is completed to the control 45 through conductors 59 and 60 connected to the brushes which engage the conductors 47, a brush 49 connecting the conductor 59 to the ring portion of the conductor 47 and the brush 53 connecting the conductor 60 to the tapered portion 48.

As shown in FIGS. 3 and 4, the rotor 14 comprises right cylindrical body 62 which may be of cast iron and has sealing rings 63 mounted in annular grooves in its side walls. The rings are pressed outwardly by spring rings 64 in the grooves. For the purpose of the dynamic balancing of the rotor and of lowering its weight, a plurality of holes, or cylindrical voids, may be provided in the rotor as indicated at 65, three such holes being shown, and each hole being closed by discs or plates 66, one at each end. The plates 66 have been omitted in FIGS. 1, 6, 7 and 8 to avoid complications in those views. In addition to the oles 65, an air passage 67 is provided parallel to the xis of the rotor and near the outer surface, this passage being open at both ends and provided with a plurality of pairs of discharge ducts 68, which, as shown in FIG. 1, extend angularly outwardly away from the passage 67. The ducts 68 are the passages through which air is admitted to the combustion chamber, the timing of admission of air being determined by the position of the rotor.

Figure 5:
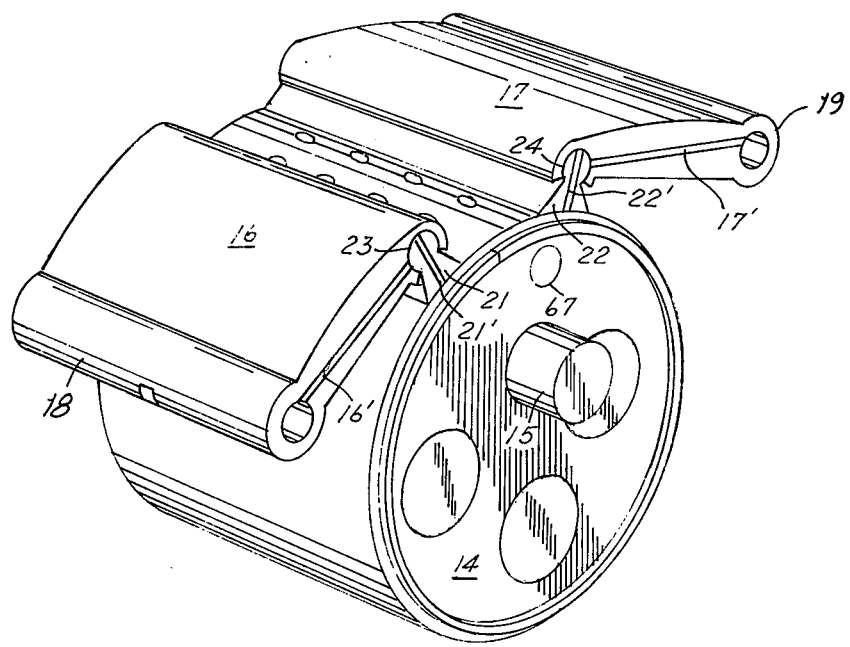
FIG. 5 is an isometric view of the rotor and barrier partitions of the engine.

Throughout its operation, the rotor 14 remains in engagement with the sealing elements 21 and 22 of the barrier partitions 16 and 17, respectively, and the partitions 16 and 17 together with the intermediate portion of the rotor 14 constitute the separating wall between the combustion chamber and the air pumping chamber and the movements of partition members 16 and 17 with the eccentric rotor allow for the expansion and compression of gases in each of the chambers. The assembled relationship of the rotor and the barrier partitions is shown in FIG. 5.

The engine of this invention is constructed in a manner rendering it conducive to complete combustion and smooth, quiet operation. Compression is uniform at all engine speeds. It has high torque at low speeds and can use a wide range of fuels to provide great power for its physical size. The engine is inherently balanced. A plurality of individual units can be readily interconnected to secure overlapping power strokes.

OPERATION OF THE ENGINE

Figure 6:
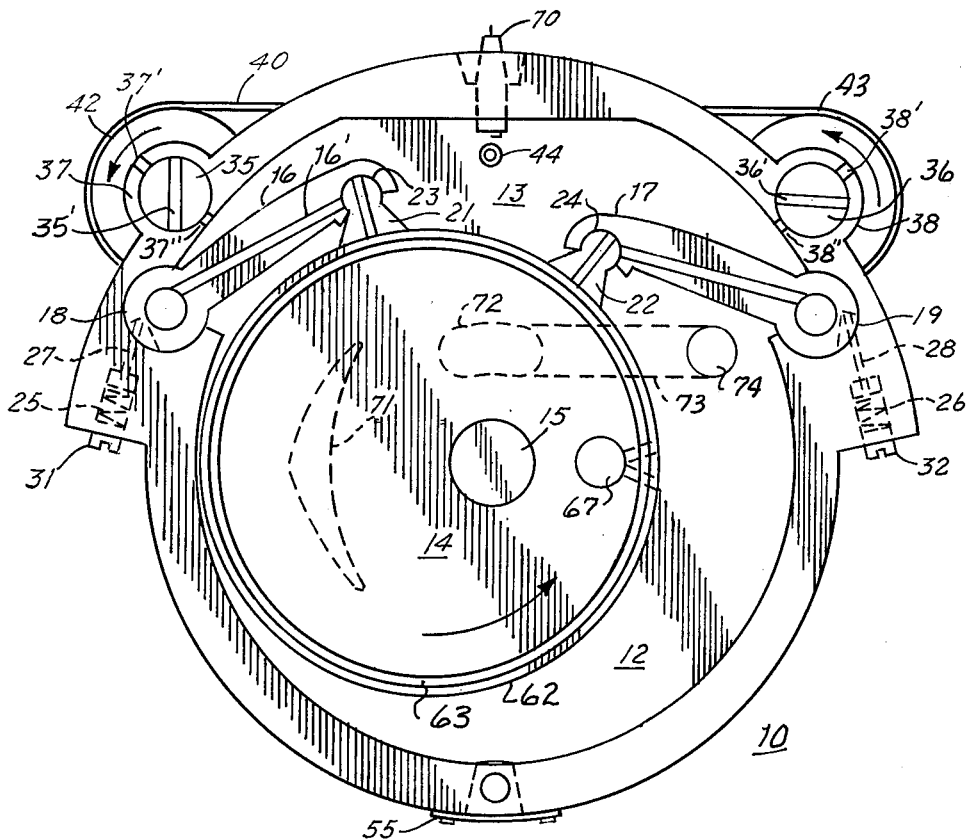
FIG. 6 is a view similar to FIG. 1 with the rotor turned through 90°.

Referring again to FIG. 1, and assuming that the rotor 14 is revolving, either during operation of the engine or at the start when it is being turned by an electric starting motor, the charge of air has been compressed in the combustion chamber, the exhaust valves 35 and 36 being closed and a charge of fuel from the injector 14 forms a combustible mixture, whereupon it is ignited by a spark at a plug indicated at 70, and the pressure of the burning mixture is then exerted against the fluid barriers 16 and 17. The fuel is burned as a stratified charge rather than as a complete mixture such as is supplied from a carburetor. The force of the expanding gases is effective to move the rotor 14 by the application of the forces at crank arms about the shaft 15, as determined by the eccentricity of the rotor. Air present in the air pumping or impeller chamber 12 will then be slightly compressed as the rotor moves in a counter-clockwise direction as viewed in FIG. 1 and, by way of example, reaches a position as shown in FIG. 6, which is at 90° from the position of FIG. 1 and in which position the air intake to the pumping chamber, indicated at 71, is still closed by the end wall of the rotor. The exhaust valves 35 and 36 have moved through 45° and are still closed. The intake 71 is provided in the end plate 34 on the far side as viewed in FIG. 6. As the combustion chamber expands, compression of the air by impeller action in the air pumping chamber continues and at the position shown in FIG. 7 the rotor has moved 90° from its position in FIG. 6; the combustion chamber has reached its maximum volume and the exhaust valves 35 and 36 have moved through forty-five degrees and are fully opened. In this position, the passage 67 has been moved into communication with an air outlet 72 and is at the center of the outlet. The outlet 72 is connected with the air pumping chamber by a duct 73 opening into the air compression chamber through a vent 74. The opening 72 is elongated so that the air will be admitted to the rotor and thence discharged into the combustion chamber for substantially the full period during which the passage 67 is in the zone between the barrier feet 21 and 22.

Figure 7:
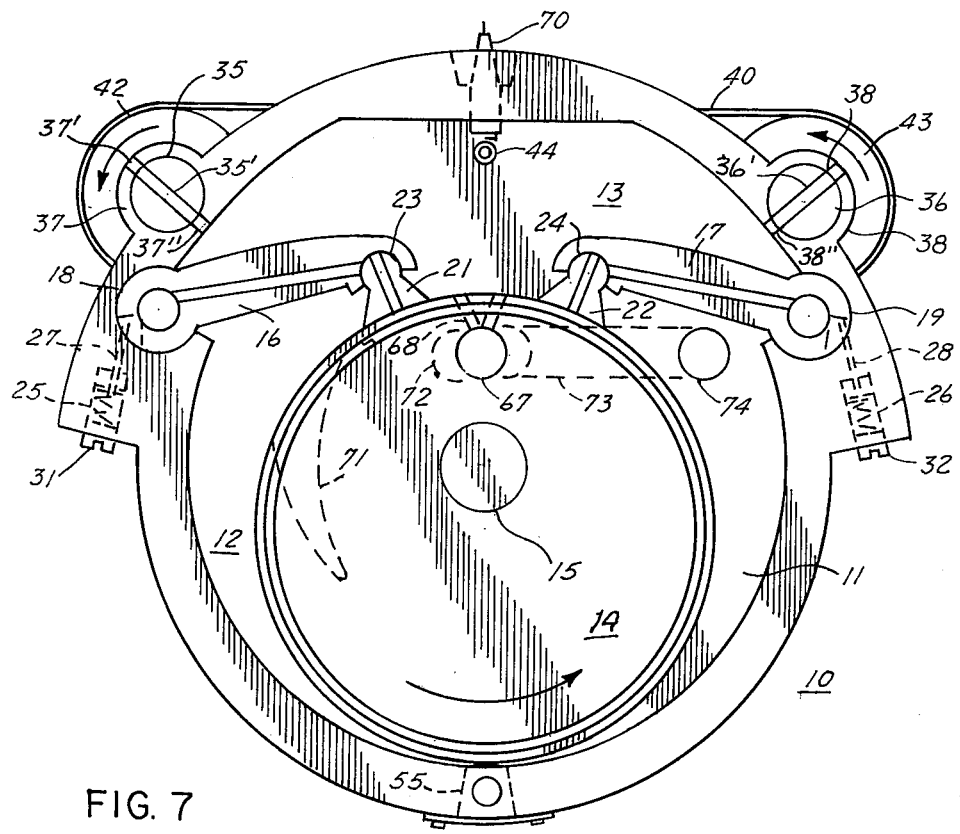
FIG. 7 is a view similar to FIG. 1 with the rotor turned through 180°.
Figure 8:
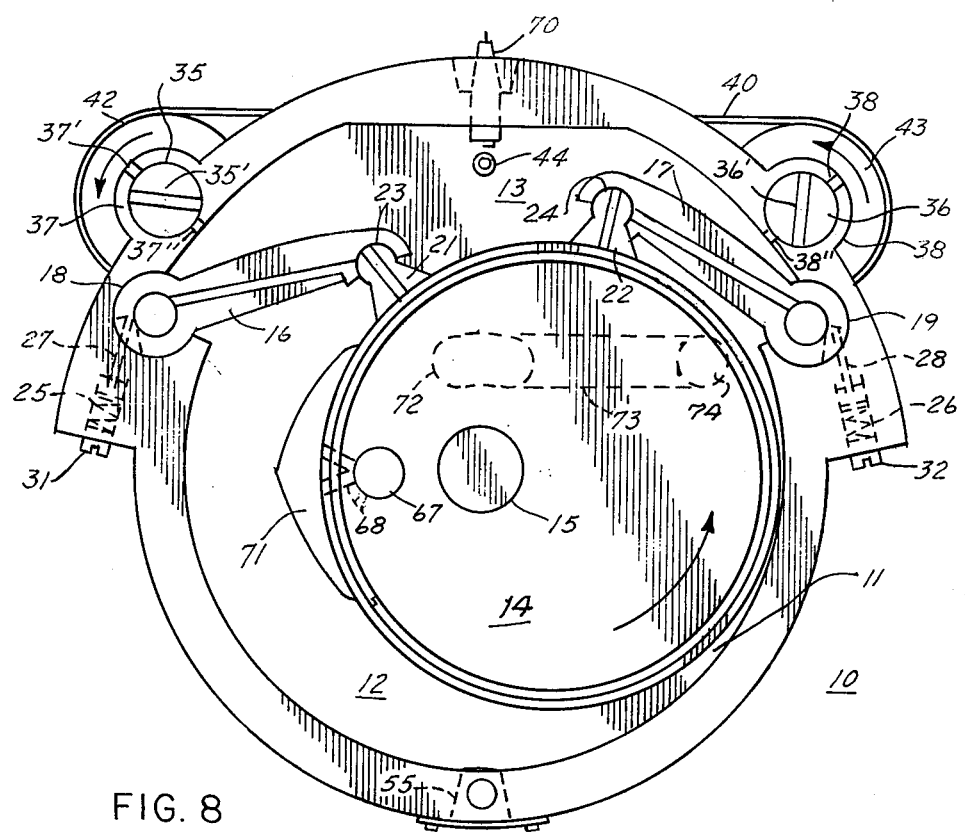
FIG. 8 is a view similar to FIG. 1 with the rotor turned through 270°.

During the initial period as the rotor approaches its position in FIG. 7, when the air is admitted to the combustion chamber through the ducts 68 from the passage 67, the exhaust valves 35 and 36 are open and the flow of air from the ducts 68 toward both sides of the combustion chamber effects a purging of the chamber to remove the combustion gases, so that substantially only fresh air from the pumping chamber is present in the combustion chamber when the exhaust valves are closed. As the rotor moves from its position in FIG. 7 toward its position in FIG. 8, it uncovers the fresh air intake port 71 and fresh air is drawn into the intake chamber behind the rotor. The exhaust valves 35 and 36 have moved another forty-five degrees and have been closed. As the rotor continues its rotation, the exhaust valves remain closed and air is compressed in the combustion chamber; near the top of the compression stroke the fuel is injected and ignited to continue the cycle. It will be noted that during the movement of the rotor from the position of FIG. 6 to that of FIG. 7, and after closing of the exhaust valves, the air supply under pressure provides a degree of supercharging. This provides effective performance of the engine over a wide range of atmospheric conditions. During the rotation of the rotor when its axial line nearest the cylindrical portion of the cavity has moved about 30 degrees from the bottom position in which it is shown in FIG. 7, it reaches an enlarged portion of the cavity which has a greater radius than the main cylindrical portion and this provides increased communication between the two sides of the rotor, so that the pressures in the intake chamber and the air compression chamber are equalized. This removes the air compressing load from the rotor and the full momentum of the rotor is available for compressing the gas in the combustion chamber as the rotor returns to its position in FIG. 1.

For multiple cylinder engines the timing and fuel injection may be controlled easily to provide the required firing sequence. The single cylinder engine of my invention is well balanced and the combination in a multi-cylinder engine provides an inherently very well balanced assembly.

While I have illustrated my invention in connection with a specific embodiment thereof, other applications and modifications will occur to those skilled in the art. Therefore, I do not desire my invention to be limited to the details shown and described and I intend, by the appended claims, to cover all modifications which fall within the spirit and scope of my invention.

I claim:

1. An internal combustion engine of the rotary type comprising:
    a housing having a cavity therein with parallel flat end walls, a portion of said cavity being of right cylindrical configuration,
    a power shaft extending through said housing and mounted for rotation about the axis of said cylindrical portion,
    a cylindrical rotor rigidly and eccentrically mounted on said shaft for rotation about the axis of said cylindrical portion with its ends in sealing engagement with said end walls of said cavity, the throw or lobe of said eccentric rotor being slightly less than the radius of said cylindrical portion of said cavity whereby said rotor moves in closely spaced relationship, but does not touch, said cylindrical portion during a predetermined part of each revolution,
    a pair of barrier partitions each pivotally mounted on the inner wall of said housing along one edge and slidably engaging said rotor along its opposite edge and cooperating with said rotor to divide said cavity to provide a combustion chamber and an air pumping chamber, said cylindrical portion of said cavity being in the air pumping chamber, said opposite edges providing sliding seals between said combustion and air pumping chambers,
    means for biasing said opposite edges of said partitions into engagement with said rotor,
    said rotor during movement adjacent said cylindrical portion dividing said air pumping chamber to provide an air intake chamber and an air compressing chamber,
    said opposite rotor engaging edges of said barrier partitions being positioned to apply the force of high pressure in the combustion chamber against said rotor and thereby utilizing the eccentricity of said rotor to drive said shaft,
    means for supplying fuel and air to said combustion chamber to provide a combustible mixture, said means including means for supplying the air from said air compressing chamber,
    means for igniting the fuel and air mixture,
    means for providing at least one exhaust passage for discharging burnt gases from said combustion chamber, and
    said air supplying means utilizing said exhaust passage means and air from said compressing chamber for purging burnt gases from said combustion chamber.

2. An internal combustion engine of the rotary type as set forth in claim 1, wherein each of said barrier partitions comprises a main body member, and said opposite edge comprises an elongated element pivotally mounted along the edge of said body member remote from the pivotal support thereof on said housing.

3. An internal combustion engine of the rotary type as set forth in claim 2, wherein said elongated member has a concave surface of cylindrical configuration fitting the configuration of said rotor and being of substantial width to provide a sealing surface.

4. An internal combustion engine of the rotary type as set forth in claim 1, wherein said means for biasing said opposite edges of said partitions into engagment with said rotor comprises a spring mounted on said housing adjacent the pivotal mounting of said barrier partition and means utilizing said spring to urge said partition to rotate about its pivot in the direction to press the opposite end of said barrier against said rotor.

5. An internal combustion engine of the rotary type as set forth in claim 1, wherein said cavity is enlarged along its side remote from said cylindrical portion and wherein said barriers are mounted in said enlarged portion of the cavity and form said combustion chamber in said enlarged portion.

6. An internal combustion engine of the rotary type as set forth in claim 1, wherein said means for discharging burnt gas from said combustion chamber comprises at least one port adjacent the pivotal mounting of each respective barrier plate, whereby when said ports are open, gases may be purged from the center of the combustion chamber outwardly towards both exhaust ports.

7. An internal combustion engine of the rotary type as set forth in claim 1, wherein said air pumping chamber is provided with an air intake port near one of said barrier partitions and with an air discharge port near the other said barrier partitions, whereby said partitions are cooled by air circulating from and to said respective ports.

8. An internal combustion engine of the rotary type as set forth in claim 7, wherein said rotor is provided with a longitudinal passage parallel to its axis and a plurality of air discharge ports between said passage and the surface of said rotor, means for connecting said rotor passage with said plurality of air discharge ports when said rotor is in a position in which said ports discharge into said combustion chamber, whereby combustion air and purging air are discharged into said combustion chamber.

9. An internal combustion engine of the rotary type as set forth in claim 8 including an elongated port communicating with said air discharge ports for maintaining the flow of air into said rotor for a predetermined angle of rotation of said rotor.

10. An internal combustion engine of the rotary type as set forth in claim 1, including electrical means for adjusting the quantity and timing of fuel supplied to said combustion chamber.

11. An internal combustion engine of the rotary type as set forth in claim 1 including means effective at a predetermined position of said rotor for increasing the communication opening between said air intake chamber and said air compressing chamber.

12. An internal combustion engine of the rotary type comprising:
 a housing having a cavity therein including a portion of cylindrical configuration,
 a power shaft extending through said housing and mounted for rotation about the axis of said cylindrical portion,
 a cylindrical rotor rigidly and eccentrically mounted on said shaft for rotation about the axis of said cylindrical portion, the throw or lobe of said eccentric rotor being slightly less than the radius of said cylindrical portion of said cavity whereby said rotor moves in closely spaced relationship, but does not touch, said cylindrical portion during a predetermined part of each revolution,
 means including a pair of movable barrier partitions, each pivotally mounted on the wall of said housing along one edge and slidably engaging said rotor along its opposite edge and cooperating with said rotor for dividing said cavity to provide a combustion chamber and an air pumping chamber, said cylindrical portion of said cavity being in the air pumping chamber and the slidable engagement of said partitions and said rotor providing seals between said combustion chamber and said pumping chamber,
 means for biasing said opposite edges of said partitions into their sliding engagement with said rotor,
 means for sealing the ends of said rotor and of said partitions in sealing relationship with the side walls of said cavity,
 said rotor dividing said air pumping chamber into an air intake chamber and an air compressing chamber,
 said opposite engaging edges of said partitions being positioned to apply the force of high pressure in the combustion chamber against said rotor and thereby utilizing the eccentricity of said rotor to drive said shaft,
 means for supplying air from said compression chamber to said combustion chamber,
 means for supplying fuel to said combustion chamber to form a combustible mixture,
 means for igniting said mixture, and
 means including an exhaust valve for discharging combustion gases from said combustion chamber and affording purging of such gases from said combustion chamber by the admission of air from said compression chamber.

* * * * *